No. 853,216. PATENTED MAY 14, 1907.
O. T. BLATHY.
METHOD OF AND APPARATUS FOR MEASURING ELECTRIC CURRENTS.
APPLICATION FILED AUG. 10, 1905.
3 SHEETS—SHEET 1.
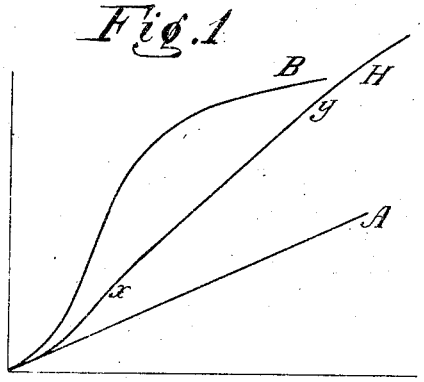
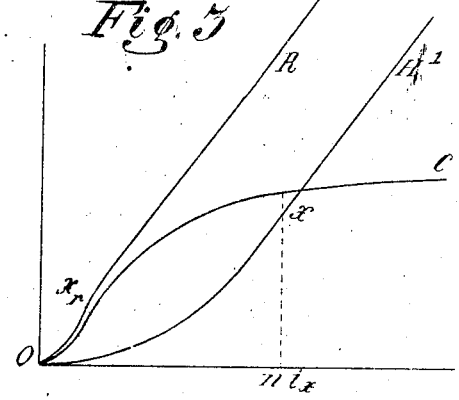
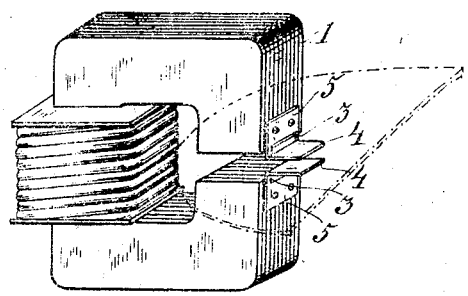

No. 853,216. PATENTED MAY 14, 1907.
O. T. BLÁTHY.
METHOD OF AND APPARATUS FOR MEASURING ELECTRIC CURRENTS.
APPLICATION FILED AUG. 10, 1905.

3 SHEETS—SHEET 3.

Witnesses
Joseph J. Pierando.
W. A. Pauling.

Inventor:—
Otto Titus Bláthy
by Giffrid & Bull
Attys.

UNITED STATES PATENT OFFICE.

OTTO TITUS BLÁTHY, OF BUDAPEST, AUSTRIA-HUNGARY.

METHOD OF AND APPARATUS FOR MEASURING ELECTRIC CURRENTS.

No. 853,216.   Specification of Letters Patent.   Patented May 14, 1907.

Application filed August 10, 1905. Serial No. 273,546.

*To all whom it may concern:*

Be it known that I, OTTO TITUS BLÁTHY, a subject of the King of Hungary, residing at Lovohaz utcza 39, Budapest, Hungary, have invented certain new and useful Improvements in Methods of and Apparatus for Measuring Electric Currents, of which the following is a specification.

My present improvement relates to apparatus in which a magnetic field in an iron or equivalent core, proportional to the magnetizing force applied thereto is desirable through a wide range, and particularly to apparatus for measuring electric currents, and it consists in certain novel methods and in certain novel parts and combinations of parts particularly pointed out in the claims concluding these specifications.

Figure 4:
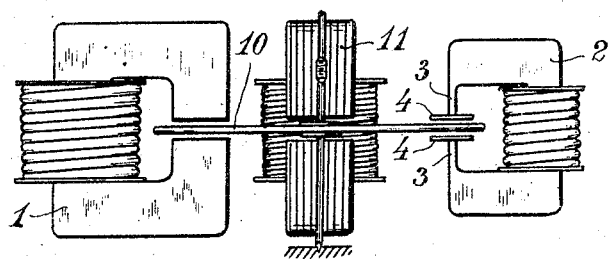
Figures 5, 9:
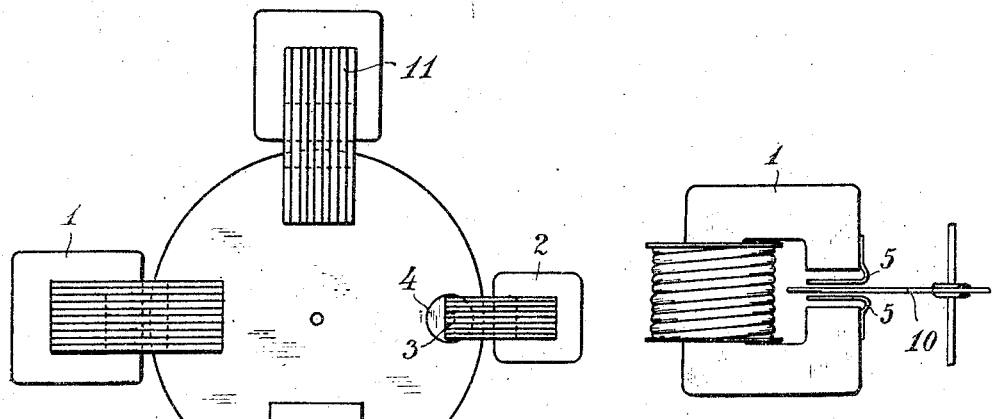
Figure 6:
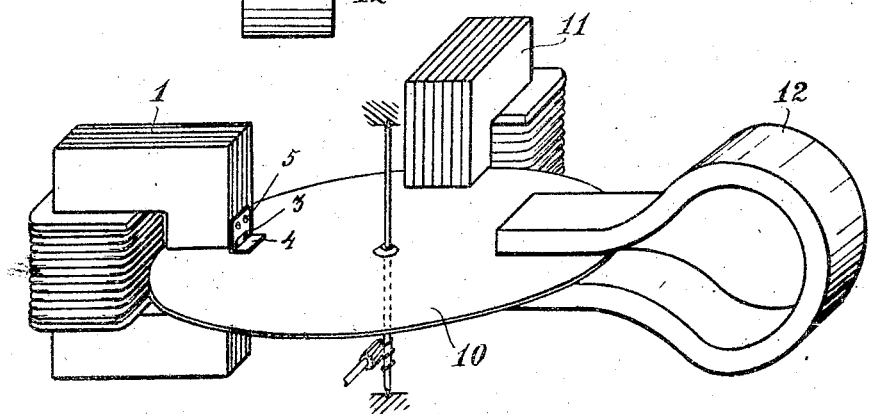
Figure 11:
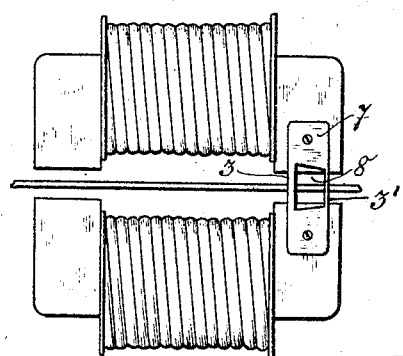
Figure 12:
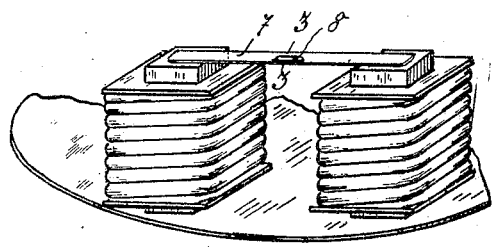
Figure 13:
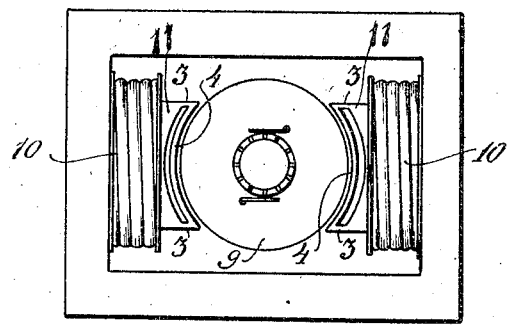

Referring to the drawing, Figures 1 and 3 show curves showing the effective magnetic intensity of certain circuits and combinations of circuits. Fig. 2 is a curve illustrating the effect of the invention upon the accuracy of the meter; Figs. 4 and 5 are respectively diagrammatic elevation and plan of a meter constructed in accordance with the invention; Fig. 6 is a perspective diagrammatic illustration of a modified form; Fig. 7 is a detail thereof; Figs. 8, 9, 10, 11 and 12 are detail views of other modified forms; Fig. 13 is a diagrammatic plan view of a meter showing the application of the invention with a direct-current measuring instrument.

In electric measuring apparatus in which the action of the magnetic field produced by the current to be measured is utilized for determining the strength or intensity of the current, the intensity of said field should vary in exact proportion to the intensity or strength of the current to be measured. This condition is fulfilled when the field contains no iron—or, in other words, is produced in air merely. When iron is used, the intensity of the magnetic field does not vary in exact proportion to the intensity or strength of current to be measured.

Referring to Fig. 1 of the drawings, the abscissæ correspond to the number of ampere turns and the ordinates to the corresponding intensity of field. The curve A represents the condition when there is no iron in the circuit. The curve B represents the condition when the circuit is composed entirely of wrought iron. The curve H represents the condition when the circuit is composed partly of iron and partly of air. It will be seen that in the curve H only the portion between $x$—$y$ shows a condition of approximate proportionality. As the measuring power of the apparatus upward is always limited, it can be so arranged that the highest measurement will not be above the point $y$; but the measuring requirement cannot be conveniently limited downward (especially in apparatus for measuring consumption of current) to such an extent as to make the lowest measurement remain above the point $x$, since that point is situated considerably higher than the smallest intensity of currents which must be measured. The sensitiveness of the apparatus is also considerably less below the limit of proportionality, $x$. The inaccuracy of a meter in which the lines of force pass partly through iron and partly through air is shown in a still more striking manner in Fig. 2, in which the abscissæ represent the intensity of current and the ordinates the proportion between the exciting field and the intensity of current—that is to say, the value generally designated as the constant, or the reading factor, of the apparatus. In this figure the curve shows the variation of the coefficient of the measuring apparatus with the intensity of current, and the cross hatched surface shows the deviation from the ideal state in which the reading factor is a constant value for the whole range of measurement.

Owing to the facts above set forth, the use of iron in electric meters, more particularly those used for measuring the consumption of continuous current, has, in some cases, been discontinued; but the result has been that the field has been considerably weakened and a great number of ampere turns required to obtain the desired strength of field. In apparatus for measuring alternating current the use of iron cannot, as a rule, be dispensed with and large air gaps have been employed for the purpose of reducing the inaccuracy of the instrument, resulting in a considerably weakened field without the error being satisfactorily eliminated.

My present invention relates to a device for maintaining proportionality down to a lower limit of measurement, without discontinuing the use of iron or other magnetic material, and without increasing the size of the air gap. To accomplish this result, I employ a second magnetic circuit, the limit of saturation of which is reached at approximately that intensity of current at which the original uncorrected field begins to be approximately in fixed proportion to the intensity of the exciting current. The effect of such an arrangement is illustrated in Fig. 3, in which the abscissæ correspond to the ampere turns and the ordinates to the intensity of the field.

H' is the lower portion of the curve H shown in Fig. 1, but drawn to a much larger scale, the point $x$ being the lowest limit of proportionality as in Fig. 1. Below this point the curve H is concave, so that currents of smaller intensity than $x$ will be underregistered by the meter.

C is the curve of a second magnetic circuit passing through a para-magnetic substance and acting on the measuring means, this circuit being designated herein as the "correction field." This field is arranged so that it is substantially or approximately saturated when the intensity of the current nearing $n\ i_x$ corresponds to the lower limit of proportionality, $x$, of the main field H'. These two fields combine to form one resultant field represented by the curve R, the limit of proportionality of which is at $x_1$, which is quite close to the zero point. If this latter limit of proportionality is still within the intensities that ought to be measured, it can be further reduced by providing another correction field which will become saturated when the intensity of the current corresponds, say, to the proportionality limit $x_r$. In most cases it is, however, sufficient to provide only one correction field.

My invention can be applied to any apparatus in which a magnetic field proportional to the current strength should be provided, as, for instance, in measuring instruments such as ammeters, but as my improvements are of especial importance in the building of integrating meters such as ampere-hour or watt-hour meters, the invention is shown in Figs. 4 to 13 applied to such meters and in Figs. 4 to 12 to alternating current meters of the Ferraris type. Such alternating current meters consist substantially of a revolving disk, a field excited by the main current and a shunt field, said main current and shunt field being disposed respectively to each other in a manner to develop in the disk eddy currents reacting on said fields, and producing thereby a torque causing said disk to rotate. A variety of forms of such meters are shown in a former patent issued to me No. 423,210.

My invention may be embodied in many different forms of meters, several of which are illustrated in Figs. 4 to 12 in the accompanying drawings, which show apparatus for measuring alternating currents using an induction disk, and in Fig. 13, which shows a construction of apparatus for measuring continuous current, using a drum armature. The following is a description of said figures:

Fig. 4 is a diagrammatical front elevation of a current meter of the well known Ferraris type modified according to my invention and Fig. 5 is a diagrammatical plan view.

Figure 10:
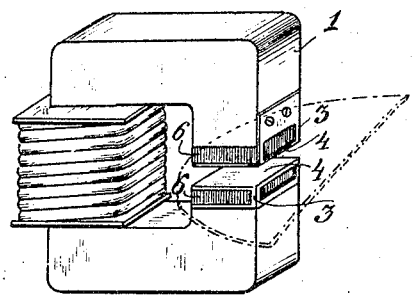

Referring to Figs. 4 and 5, 10 is the revolving disk of the meter, 1 is an electro-magnet excited by the main current and producing the main field, 11 is the usual shunt electromagnet of relatively high inductance excited by the pressure of the current, 12 is a permanent magnet for retarding the revolving disk. The respective actions of the electro-magnets 1 and 11 will cause the disk 10 to revolve. The frame and base plate supporting the different parts, the bearings of the shaft of the revolving disk as well as the registering mechanism are not shown in the drawing. 2 is the magnet producing the correction field. The core of the magnet 2 has, at certain portions, as at 3—3, a reduced cross section, whereby the saturation of the field produced by this magnet at comparatively weak currents is effected. By suitably choosing the material for the core 2, the cross-section length of the sections 3, 3 the area of the pole surfaces 4, 4 and the length of the air-gap between said surfaces, the curve C (Fig. 3) of the correction field can be determined to give the desired result.

Instead of using an independent electromagnet for producing the correction field, the electromagnet core in the main field may be utilized for this purpose, as shown in Figs. 6 to 12. In Fig. 6 the correction field is produced by the angle-plate 5, 5 secured to the poles of the main field magnet 1. The horizontal portions 4, 4 of these angle-plates constitute the pole faces and these are connected to the vertical parts by narrow bridges 3, 3.

In Fig. 6 the arrangement of the magnets is shown in perspective view. 11 is the shunt-magnet and 12 the braking permanent magnet.

Fig. 7 shows a detail view of the main field magnet of Fig. 6 the revolving disk being indicated in dotted lines.

Figure 8:
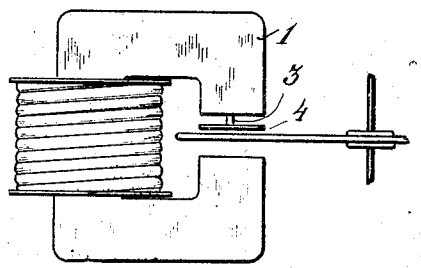

Instead of placing the main field and the correction field side by side, as shown in Fig. 7, they may be superimposed one upon the other, as shown in Figs. 8 to 13. In Fig. 8 the plate 4 is connected to the face of the pole of the magnet 1 by means of a narrow bridge or strip 3. If desired, the plates can be arranged on both pole surfaces, as shown in Fig. 9.

Referring to Fig. 10, 6, 6 are blocks of some magnetically indifferent material—such, for instance as brass, copper, vulcanized fiber, or the like—inserted between the main pole surfaces of the magnet and the correction pole surfaces to increase the strength of the structure and diminish the liability of the correction pole faces being distorted or bent. Figs. 11 and 12 illustrate the application of my invention to a series of magnets in which the lines of force pass through air gaps at two or more points, the correction field being formed, in the example illustrated, by iron strips 7 containing narrow bridges 3, formed by piercing said strip 7 by a hole 8.

In Fig. 11 it will be observed that the left-hand bridge 3 is considerably thicker and longer than the right-hand bridge 3'. The dimensions of the former are made so as to correspond to a correction field of the first order and the dimensions of the latter are made to correspond to a correction field of the second order. In this way the limit of proportionality, as above described, is carried down still farther in the curve R, Fig. 3. Similarly the bridges of the other figures may be proportioned to give correction fields of different orders, if desired. As the bridges would, in some cases, if made of iron, have to be so thin as to be difficult to manufacture or too fragile, they may be made, in whole or in part, of some other magnetic material of less permeability than iron—such, for instance, as nickel, cobalt, or some of the para-magnetic alloys.

Fig. 13 shows a meter for measuring the consumption of continuous current provided with a drum armature 9 and with field coils 13, 13 having iron cores 14. In front of the pole surfaces of the iron part are arranged correction pole plates 4, 4 connected to the iron cores by thin bridges 3.

Having thus described my invention in forms which are at present preferred by me, it will be understood that various modifications and changes may be made in the apparatus and that the principles of the invention may be applied to analogous uses without departing from the spirit of my invention and without exceeding the scope of my claims.

1. The method of producing a magnetic field substantially proportional to the magneto-motive-force applied to magnetic material through a wide range of variation, which consists in producing different intensities of magnetization in said material for given magneto-motive-forces, thereby varying the permeability of certain parts inversely with the variation of other parts, as the applied magneto-motive-force varies.

2. The method of producing a magnetic field in a core composed of magnetic material substantially proportional to the strength of the magneto-motive-force applied thereto, which consists in working different parts of said core at different intensities of magnetization and thereby causing the permeability of certain parts to vary inversely with the variation of other parts, as the magneto-motive force varies.

3. The method of approximating the effect of constant permeability of the field of a device containing magnetic material which consists of varying the permeability of one portion of the magnetic material inversely to variations of permeability in other portions.

4. The method of approximating the effect of constant permeability of the field of a magnet having a core composed of magnetic material which consists of varying the permeability of one portion of the core inversely to variations of permeability of other portions of said core by working said portions at different magnetic densities.

5. The method of approximating the effect of constant permeability of the field of a magnet having a core composed of magnetic material which consists in magnetizing one portion of the core to a higher degree than another portion and causing the former to approach saturation as the latter approaches the range of density of approximately constant permeability.

6. The method of producing a magnetic field substantially proportioned to a given variable magnetizing force which consists of magnetizing one portion of the magnetic circuit to a higher degree than another portion and causing the former to approach saturation when the latter approaches the condition of constant permeability.

7. In an instrument for measuring electric current, a rotatable portion, a magnetizing portion containing iron, and means for causing the field intensities produced by the latter to be proportional to the current over any desired range.

8. In an electric meter the combination with the rotatable parts thereof of a core of magnetic material having portions of different cross-sections such that saturation is approached in one portion sufficiently earlier than in another portion to cause compensating variations in permeability tending to give the effect of constant permeability.

9. In a measuring apparatus depending upon proportionality of effective magnetic field to current for its accuracy, a magnetic core portion producing a field substantially proportional to current through one range and a core portion arranged to compensate for the lack of proportionality through a lower range, and having its saturation point occurring at about the same current at which the first portion reaches approximate proportionality.

10. In a measuring apparatus utilizing proportionality of field intensity to current and containing iron, a magnetic core portion producing a field substantially proportional to current through one range of current, a portion arranged to have a higher magnetic density for the same current and means for causing said second portion to saturate at about the current at which the intensity of the first portion reaches substantial proportionality.

In testimony whereof I have signed my name to this specification in the presence of two subscribing witnesses.

OTTO TITUS BLÁTHY.

Witnesses:
EUGENE HARRANY,
JOSEPH J. PIERANDO.